US009427993B2

(12) United States Patent
Rieck et al.

(10) Patent No.: US 9,427,993 B2
(45) Date of Patent: Aug. 30, 2016

(54) TRANSFER FILM TENSIONING IN A TRANSFER LAMINATION DEVICE

(71) Applicant: HID Global Corporation, Irvine, CA (US)

(72) Inventors: James A. Rieck, Brooklyn Park, MN (US); John P. Skoglund, Minneapolis, MN (US); Andrew Slotto, Crystal, MN (US)

(73) Assignee: Assa Abloy AB, Stockholm (SE)

( * ) Notice: Subject to any disclaimer, the term of this patent is extended or adjusted under 35 U.S.C. 154(b) by 94 days.

(21) Appl. No.: 13/895,679

(22) Filed: May 16, 2013

(65) Prior Publication Data

US 2014/0049587 A1  Feb. 20, 2014

Related U.S. Application Data

(60) Provisional application No. 61/682,892, filed on Aug. 14, 2012.

(51) Int. Cl.
*B41J 25/312* (2006.01)
*B32B 37/00* (2006.01)
*B32B 38/00* (2006.01)

(52) U.S. Cl.
CPC .......... *B41J 25/312* (2013.01); *B32B 37/025* (2013.01); *B32B 38/1875* (2013.01); *B32B 2425/00* (2013.01)

(58) Field of Classification Search
CPC .......... B32B 38/1875; B32B 2425/00; B32B 37/025; B41J 25/312; B41J 2/315
USPC ......... 347/103, 213, 188; 156/540; 399/307; 439/159; 400/120.18
See application file for complete search history.

(56) References Cited

U.S. PATENT DOCUMENTS

| | | | | |
|---|---|---|---|---|
| 5,634,731 A | * | 6/1997 | Kita et al. ............... | 400/120.18 |
| 6,097,415 A | * | 8/2000 | Kita et al. ............... | 347/213 |
| 6,108,019 A | * | 8/2000 | Katsuma et al. ......... | 347/188 |
| 6,157,399 A | * | 12/2000 | Miyaji et al. ............ | 347/213 |
| 6,206,589 B1 | | 3/2001 | Bjork et al. | |
| 6,554,044 B2 | * | 4/2003 | Paulson et al. ........... | 156/540 |
| 2007/0065187 A1 | * | 3/2007 | Kodera et al. ........... | 399/307 |
| 2007/0099462 A1 | * | 5/2007 | Helma et al. ............ | 439/159 |

OTHER PUBLICATIONS

European Search Report dated Dec. 17, 2015 for corresponding European Patent Application No. EP 13179139, filed Aug. 2, 2013.
European Written Opinion dated Dec. 17, 2015 for corresponding European Patent Application No. EP 13179139, filed Aug. 2, 2013.

* cited by examiner

*Primary Examiner* — Thinh Nguyen
(74) *Attorney, Agent, or Firm* — Westman, Champlin & Koehler, P.A.

(57) ABSTRACT

A transfer lamination method uses a transfer lamination device including a transfer ribbon comprising a transfer film on a carrier web, a print unit comprising a print head, and a transfer unit configured to transfer a film section of the transfer film to a substrate. In the method, the transfer ribbon is fed in a feed direction past the print unit and the transfer unit. Tension is generated in the transfer ribbon using the print head while processing the transfer ribbon using the transfer unit.

16 Claims, 4 Drawing Sheets

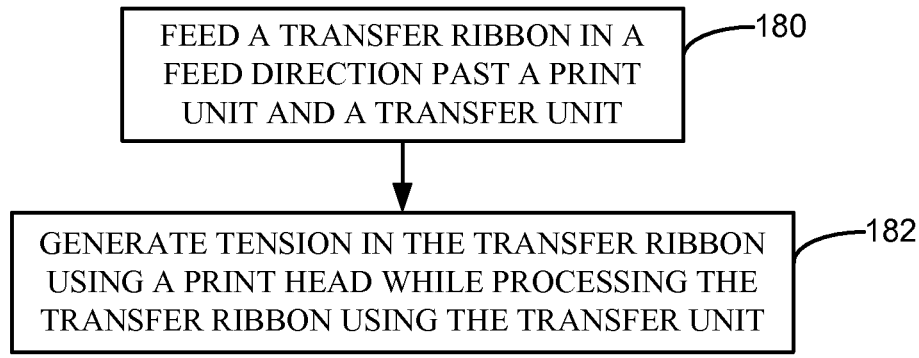
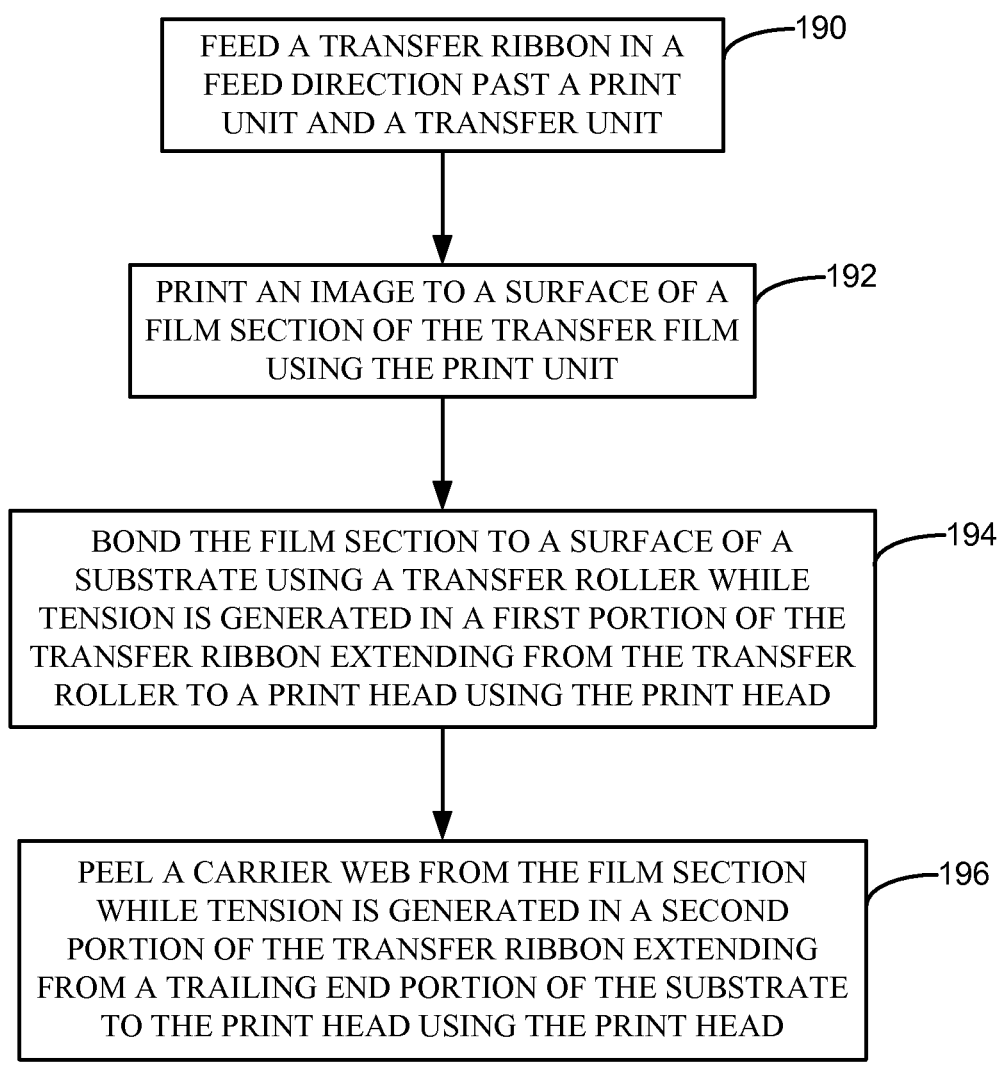

TRANSFER FILM TENSIONING IN A TRANSFER LAMINATION DEVICE

CROSS-REFERENCE TO RELATED APPLICATION

The present application is based on and claims the benefit of U.S. provisional patent application Ser. No. 61/682,892, filed Aug. 14, 2012, the content of which is hereby incorporated by reference in its entirety.

FIELD

Embodiments of the invention are directed to transfer lamination processes performed by transfer units, such as transfer units of credential production devices.

BACKGROUND

In a transfer lamination process or method, a transfer device or unit is used to transfer an overlaminate material from a transfer ribbon to a surface of a substrate through the application of heat and pressure. This process can be used to provide protection to the surface from abrasion and environmental conditions, for example. When the overlaminate material contains an image, the transfer lamination process can be used to transfer the image to the surface of the substrate.

The overlaminate material transferred to the surface of the card substrate using the heated roller is generally one of two types: a patch laminate, or a fracturable laminate or transfer layer often referred to as a "thin film laminate." The patch laminate is generally a pre-cut polyester film that has been coated with a thermal adhesive on one side. The pre-cut patch is removably attached to a continuous carrier web. The transfer unit heats the patch to activate the adhesive and presses the adhesive-coated side of the patch to the surface of the substrate to bond the patch to the surface. The carrier web is detached from the patch to complete the transfer operation.

Transfer layers or films are generally continuous resinous materials that have been coated onto a continuous carrier web or backing. The side of the resin material that is not attached to the continuous carrier web is generally coated with a thermal adhesive. The transfer unit is used to activate the adhesive and press the adhesive-coated resinous material against the surface of the substrate to bond the material to the surface. The carrier web or backing is then removed to complete the transfer lamination process.

Credential production devices often include transfer units to perform a transfer lamination process on credential substrates to form the desired credential product. Exemplary credentials include identification cards, driver's licenses, passports, and other documents. The credential substrates, on which the transfer lamination process is performed, typically include card substrates formed of plastic or other material.

One disadvantage to the use of a patch laminate with a credential card substrate is that the patch laminate does not provide full edge-to-edge protection to the surface of the card substrate. This is because the patch laminate must be formed slightly smaller than the surface of the card substrate to ensure that the patch laminate does not extend beyond the edges of the substrate.

One advantage of the use of a transfer film is that it can be laminated over the entire surface of a credential card substrate. After the transfer unit bonds the transfer film to the surface of the card substrate, the transfer film fractures along the edges of the substrate as the web carrier is removed from the bonded portion of the transfer film. Thus, the transfer film can provide full edge-to-edge coverage of the surface of the card substrate. As a result, transfer films can provide greater surface protection than patch laminates.

Transfer units of credential production devices utilize the transfer film as a print intermediate to form an image on the credential card substrate in accordance with a reverse-image printing process. In the reverse-image printing process, an image is printed to the exposed side of the transfer film prior to its lamination to the surface of the card substrate. Next, the image on the transfer film is registered with the card substrate. The transfer unit is used to activate the adhesive on the imaged transfer film causing the imaged transfer film to bond to the surface of the card substrate. The carrier web of the transfer ribbon is then removed from the bonded imaged transfer film to complete the transfer of the image to the card substrate. The transfer film provides protection to the image and the surface of the card substrate.

The quality of the image printed in accordance with the above-described reverse-image printing process is partially determined by the tension in the transfer ribbon during the bonding or transfer phase of the process. Too much tension in the transfer ribbon during the transfer phase causes the image to be stretched. Too little tension in the transfer ribbon during the transfer phase may cause wrinkling of the transfer ribbon and undesirable creases in the bonded image. Accordingly, it is important to control the amount of tension in the transfer ribbon during the transfer phase.

Some transfer films include a protective layer that is configured to provide protection to the surface of the substrate to which the transfer layer is adhered. This also provides protection to any image printed on the transfer layer or printed on the surface of the substrate. In general, the protective layer provides abrasion resistance, but can also provide protection from other environmental conditions, such as moisture, ultraviolet light, and other conditions.

Edge flash occurs when the transfer film does not fracture properly along an edge of the substrate, such as the trailing edge, during the web carrier release or peeling phase of the transfer lamination process. This results in portions of the transfer film remaining adhered to the carrier web or the substrate that were respectively intended to bond to the substrate or the carrier web during the transfer lamination process. One cause of such flash is improper tension in the transfer film during the web carrier peeling phase of the transfer lamination process.

SUMMARY

Embodiments of the invention are directed to a transfer lamination method using a transfer lamination device. In some embodiments, the transfer lamination device includes a transfer ribbon comprising a transfer film on a carrier web, a print unit comprising a print head, and a transfer unit configured to transfer a film section of the transfer film to a substrate. In the method, the transfer ribbon is fed in a feed direction past the print unit and the transfer unit. Tension is generated in the transfer ribbon using the print head while processing the transfer ribbon using the transfer unit.

In some embodiments, tension is generated in the transfer ribbon by resisting the feeding of the transfer ribbon in the feed direction including pinching the transfer ribbon between the print head and a print roller of the print unit. In some embodiments, the feeding of the transfer ribbon in the feed direction is resisted by driving the print roller using a motor. In some embodiments, the feeding of the transfer ribbon in the feed direction is resisted by resisting rotation of the print roller.

In some embodiments, an image is printed to a surface of the film section using the print head. In some embodiments, this printing step is performed prior to processing the transfer ribbon using the transfer unit.

In some embodiments, the processing of the transfer ribbon using the transfer unit includes bonding the film section to a surface of a substrate, and peeling the carrier web away from the film section bonded to the substrate.

In some embodiments, the step of generating tension in the transfer ribbon occurs while bonding the film section to the surface of the substrate. In some embodiments, tension is generated in the transfer ribbon by pinching the transfer ribbon between the print head and a print roller of the print unit. In some embodiments, the film section is bonded to the surface of the substrate using a transfer roller of the transfer unit. In some embodiments, the step of feeding the transfer ribbon comprises rotating the transfer roller using a motor. In some embodiments, the tension generated in the transfer ribbon is in a portion of the transfer ribbon extending between the transfer roller and the print head.

In some embodiments, the step of generating tension in the transfer ribbon occurs while peeling the carrier web away from the film section. In some embodiments, the tension is generated in the transfer ribbon by pinching the transfer ribbon between the print head and a print roller of the print unit. In some embodiments, the tension is generated in a portion of the transfer ribbon that extends from a trailing end portion of the substrate to the print head. In some embodiments, the transfer roller is disengaged from the transfer ribbon during the step of generating tension in the transfer ribbon.

In accordance with embodiments of another transfer lamination method using the transfer lamination device, the transfer ribbon is fed in a feed direction past the print unit and the transfer unit. An image is printed to a surface of the film section of the transfer film using the print unit. The film section is bonded to a surface of the substrate using the transfer roller while generating tension in a first portion of the transfer ribbon extending from the transfer roller to the print head including pinching the transfer ribbon between the print head and the print roller. The carrier web is peeled from the film section while generating tension in a second portion of the transfer ribbon extending from a trailing end portion of the substrate to the print head including pinching the transfer ribbon between the print head and the print roller.

In some embodiments, tension is generated in the first portion of the transfer ribbon and in the second portion of the transfer ribbon by driving the print roller using a motor or resisting rotation of the print roller.

In some embodiments, the transfer roller is disengaged from the transfer ribbon while generating tension in the second portion of the transfer ribbon.

In some embodiments, the transfer ribbon is wound on a take-up spool using a motor. In some embodiments, the transfer ribbon is fed in the feed direction in response to winding the transfer ribbon on the take-up spool, or driving rotation of the transfer roller using a motor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIGS. 6 and 7 are flowcharts illustrating transfer lamination methods in accordance with embodiments of the invention.

DETAILED DESCRIPTION OF ILLUSTRATIVE EMBODIMENTS

Figure 1:
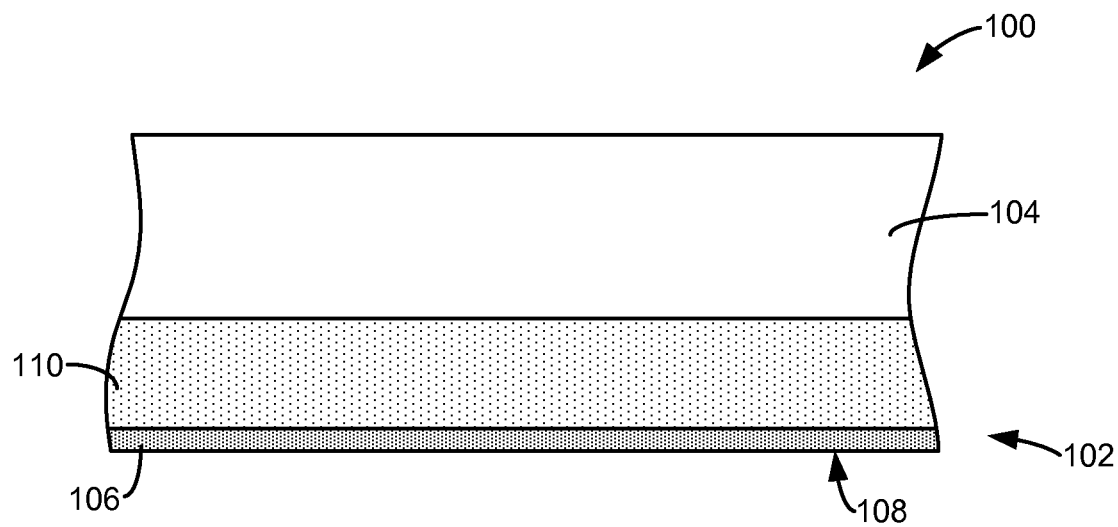
FIG. 1 is a simplified side cross-sectional view of an exemplary transfer ribbon in accordance with embodiments of the invention.

Embodiments of the invention are described more fully hereinafter with reference to the accompanying drawings. Elements that are identified using the same or similar reference characters refer to the same or similar elements. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form in order to not obscure the embodiments in unnecessary detail.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will further be appreciated by one of skill in the art, the present invention may be embodied as methods, systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the invention may also be described using flowchart illustrations and block diagrams. Although a flowchart may describe the operations as a sequential process, many of the operations can be performed in parallel or concurrently. In addition, the order of the operations may be re-arranged. A process is terminated when its operations are completed, but could have additional steps not included in a figure or described herein.

It is understood that one or more of the blocks (of the flowcharts and block diagrams) may be implemented by computer program instructions. These program instructions may be provided to a processor circuit, such as a microprocessor, microcontroller or other processor, which executes the instructions to implement the functions specified in the block or blocks through a series of operational steps to be performed by the processor(s) and corresponding hardware components.

Embodiments of the invention are generally directed to transfer lamination processes performed by transfer units, such as those used in credential production devices. Such processes involve the transfer of material from a transfer ribbon to a substrate, such as a card substrate used to form identification cards and driver's licenses, or other substrate.

FIG. 1 is a simplified side cross-sectional view of an exemplary transfer ribbon 100 in accordance with embodiments of the invention. In some embodiments, the transfer ribbon 100 includes a transfer layer or film 102 that is attached to a backing or carrier web 104. The transfer film 102 is configured to be transferred to a surface of a substrate through a transfer lamination process in accordance with embodiments of the invention.

In some embodiments, the transfer film 102 is in the form of a fracturable laminate or thin film laminate. In some embodiments, the transfer film 102 includes an image receptive layer 106 that is configured to receive an image on the surface 108. The image may be printed to the surface 108 in accordance with conventional techniques, such as through dye sublimation or inkjet printing processes.

The transfer ribbon 100 may include other conventional layers or materials that are not shown in order to simplify the illustration. These include a thermal adhesive in the image receptive layer 106, or a thermal adhesive layer on the image receptive layer 106. The thermal adhesive is activated during a transfer lamination process to bond the transfer film 102 to a substrate. The transfer ribbon 100 may also include a release layer between the transfer film 102 and the carrier web 104 that simplifies the release of the transfer film 102 from the carrier web 104 during the transfer lamination process. Other conventional materials or layers may also be included in the transfer ribbon 100.

In some embodiments, the transfer film 102 includes a protective layer 110 located between the image receptive layer 106 and the carrier web 104. Alternatively, the protective layer 110 may be combined with the image receptive layer. The protective layer 110 operates to provide protection to the surface on which the transfer film 102 is laminated. The protective layer 110 will also protect an image printed on or in the image receptive layer 106 when the transfer film 102 is laminated to the surface of a substrate.

In some embodiments, the protective layer 110 is a highly durable protective layer that is capable of withstanding 1500 or more Taber cycles. In some embodiments, the protective layer 110 includes one or more resins. In some embodiments, the protective layer 110 has a thickness in the range of 12-40 μm. In some embodiments, the protective layer 110 has a thickness of greater than 25 μm. It is understood that embodiments of the transfer lamination process described herein may be used with transfer layers 102 having protective layers 110 comprising other resins and having a thickness that lies outside the exemplary ranges provided above.

Figure 3:
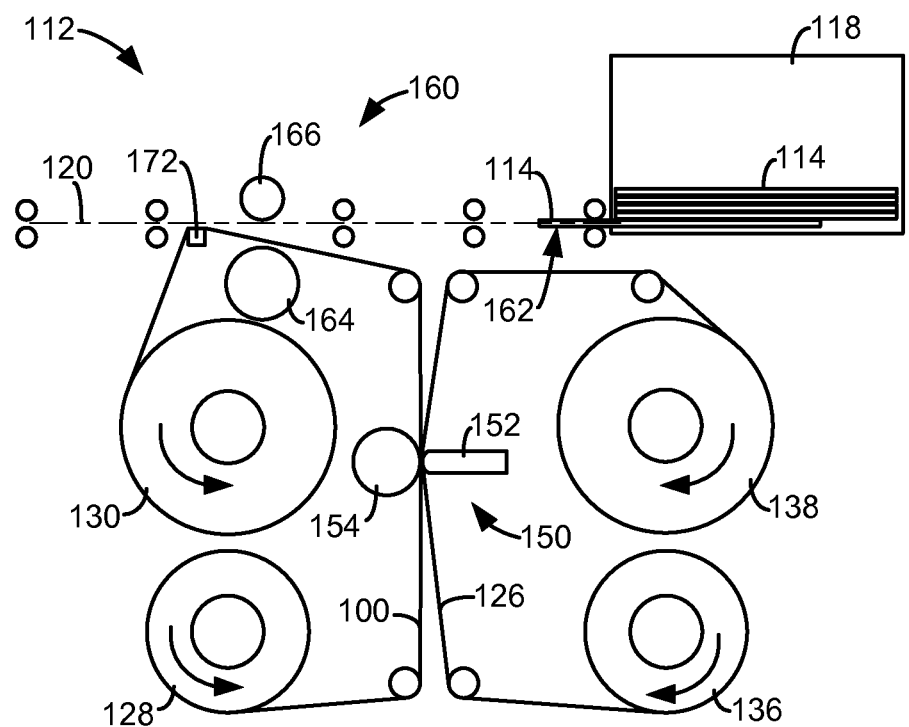
FIGS. 3-5 are simplified side views of the device of FIG. 2 in different stages of a transfer lamination method in accordance with embodiments of the invention.
Figure 2:
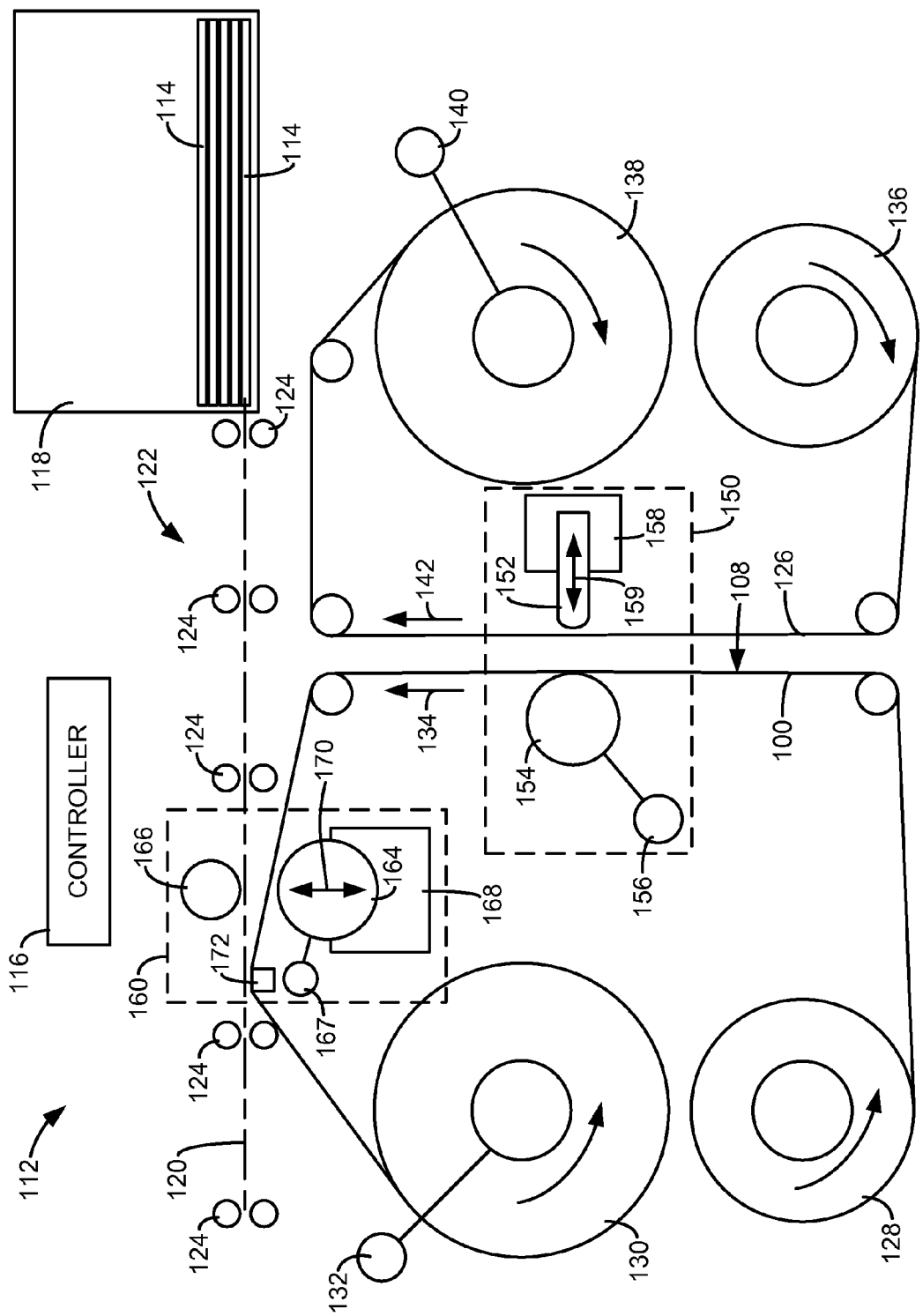
FIG. 2 is a simplified side view of an exemplary transfer lamination device that may be used to implement transfer lamination methods in accordance with embodiments of the invention.
Figure 4:
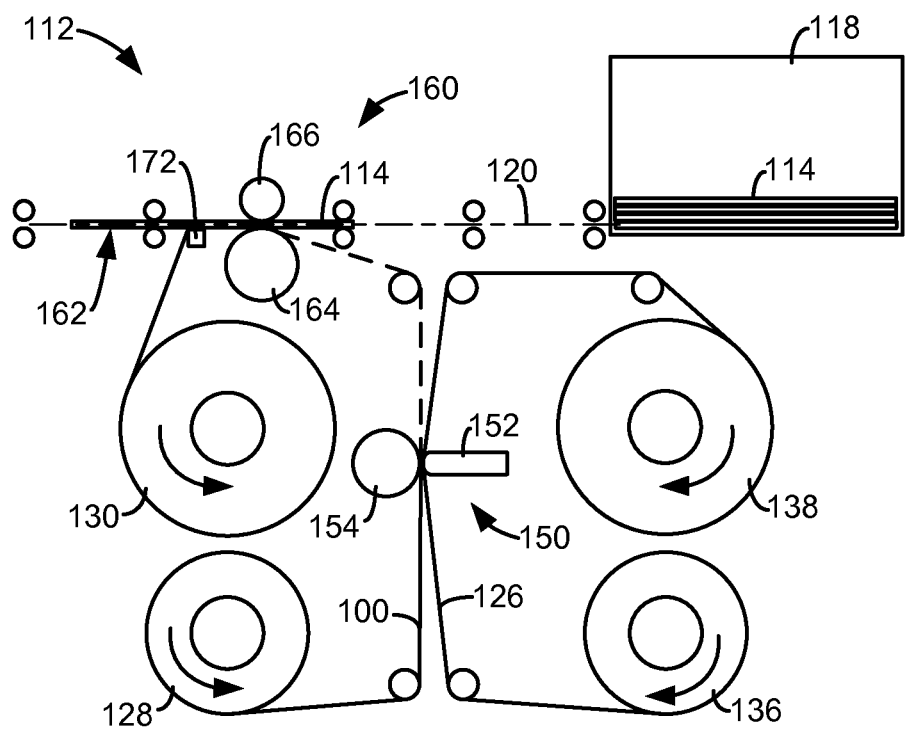
Figure 5:
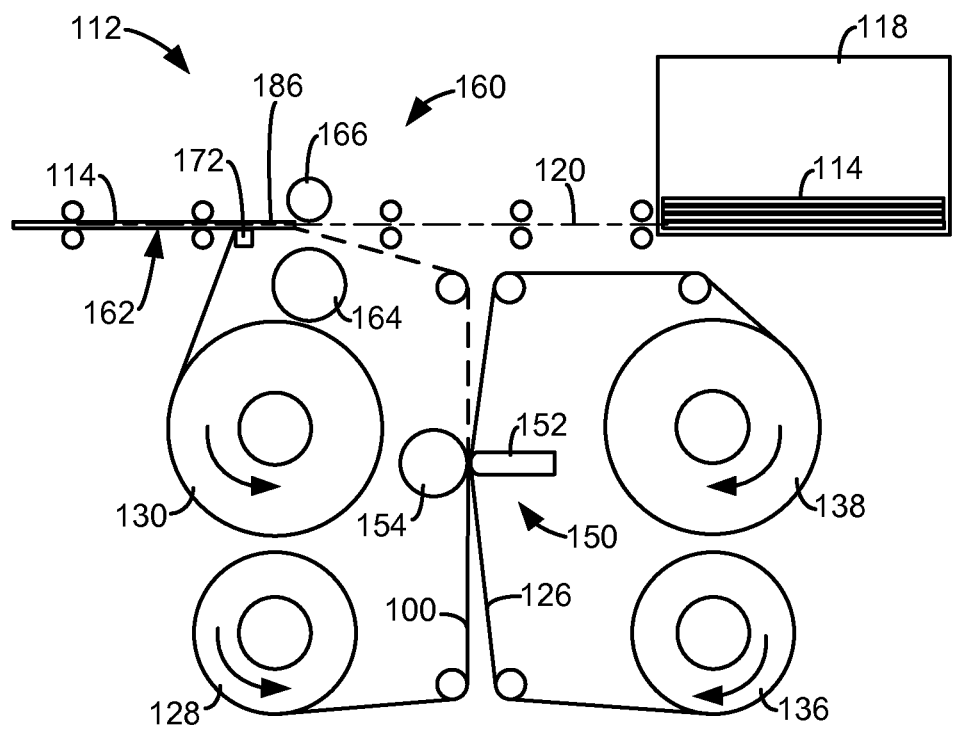

FIG. 2 is a simplified side view of an exemplary device 112 that may be used to implement transfer lamination processes on a substrate 114 in accordance with embodiments of the invention. FIGS. 3-5 are simplified side views of the device of FIG. 2 during different phases of the method. Some elements that are illustrated in FIG. 2 are not shown in FIGS. 3-5 in order to simplify the drawings.

The substrate 114 may take on many different forms, as understood by those skilled in the art. In some embodiments, the substrate 114 is a credential substrate. As used herein, the term "credential substrate" includes substrates used to form credentials, such as identification cards, membership cards, proximity cards, driver's licenses, passports, credit and debit cards, and other credentials or similar products. Exemplary card substrates include paper substrates other than traditional paper sheets used in copiers or paper sheet printers, plastic substrates, rigid and semi-rigid card substrates, and other similar substrates.

In some embodiments, the device 112 includes a controller 116 (FIG. 2), which represents at least one processor and memory. The controller 116 uses the processor to execute program instructions stored in the memory of the controller 116 or other location, to control components of the device 112 using conventional techniques, and perform functions and method steps described herein.

In some embodiments, the device 112 includes a substrate supply 118 (e.g., hopper, or cartridge) containing a plurality of the substrates 114. In some embodiments, the controller 116 controls the feeding of individual substrates 114 from the supply 118 along a processing path 120 through the control of a conventional motorized transport mechanism 122, as shown in FIGS. 3-5. Embodiments of the transport mechanism 122 include motorized feed rollers or pinch roller pairs 124, or other conventional components.

In some embodiments, the device 112 includes the transfer ribbon 100 and a print ribbon 126. In some embodiments, the print ribbon 126 comprises a plurality of conventional colored dye panels, a black resin panel, and/or other conventional thermal print ribbon panels.

In some embodiments, the transfer ribbon 100 is supported between a supply spool 128 and a take-up spool 130. In some embodiments, the controller 116 controls a motor 132 to drive rotation of the take-up spool 130 to wind the transfer ribbon 100 on the take-up spool 130 and feed the transfer ribbon 100 from the supply spool 128 in a feed direction 134. In some embodiments, the print ribbon 126 is supported between a supply spool 136 and a take up spool 138. In some embodiments, the controller 116 controls a motor 140 to drive rotation of the take-up spool 138 to feed the print ribbon 126 from the supply spool 136 in a feed direction 142 and wind the print ribbon 126 on the take-up spool 138.

In some embodiments, the device 112 includes a print unit 150 comprising a print head 152. The controller 116 controls the print head 152 to print an image to the transfer ribbon 100 using the print ribbon 126, in accordance with conventional techniques. In some embodiments, the print head 152 is a conventional thermal print head comprising a plurality of heating elements that may be individually activated to transfer print material (e.g., dye) from the print ribbon 126 to the transfer ribbon 100 and form an image on the surface 108 of the transfer layer 102.

In some embodiments, the print unit 150 includes a print platen or roller (hereinafter "print roller") 154. In some embodiments, the controller 116 may drive rotation of the print roller 154 using a motor 156.

In some embodiments, the print unit 150 includes a conventional print head lift mechanism 158, which is configured to move the print head toward and away from the print roller 154, as indicated by arrow 159. The print head lift mechanism 158 is configured to position the print head 152 between a displaced or raised position (FIG. 2), in which the print head 152 is displaced from the print roller 154, to an operating position, in which the print head 152 presses or pinches the print ribbon 126 and the transfer ribbon 100 against the print roller 154, as shown in FIGS. 3-5.

In some embodiments, the device 112 includes a transfer unit 160 that is configured to process the transfer ribbon 100. In some embodiments, the transfer unit is configured to perform a bonding phase, in which a film section of the transfer film 102 is bonded to a surface 162 of a substrate 114 fed along the processing path 120, as generally illustrated in FIG. 4. In some embodiments, the transfer unit 160 includes a heated laminating or transfer roller 164 (hereinafter "transfer roller") that heats and presses the transfer ribbon 100 against the surface 162 to bond the film section of the transfer film 102 to the surface 162. Other components can be substituted for the transfer roller 164 to perform this bonding operation. In some embodiments, the transfer unit 160 includes a support, such as a roller 166, which resists the pressure applied by the transfer roller 164 to the transfer ribbon 100 and substrate 114. In some embodiments, the controller 116 controls a motor 167, such as a stepper motor, to drive rotation of the transfer roller 164.

In some embodiments, the transfer unit 160 includes a conventional transfer roller lift mechanism 168 that is configured to move the transfer roller 164 toward and away from the processing path 120, as indicated by arrow 170. In some embodiments, the lift mechanism 168 moves the transfer roller 164 between an operating position (FIG. 4), in which the transfer roller 164 presses the transfer ribbon 100 against the surface 162 of the substrate 114, and a displaced or lowered position (FIG. 2), in which the transfer roller 164 is displaced from the processing path 120. In some embodiments, the transfer roller 164 engages the transfer ribbon 100 when in the operating position, and is disengaged from the transfer ribbon 100 when in the displaced position.

During a peeling phase of the transfer lamination process, the carrier web 104 is separated from the film section of the transfer film 102 that has been bonded to the surface 162 of the substrate 114, as shown in FIG. 5. In some embodiments, the transfer unit 160 includes a peel-off bar 172 that assist in this peeling phase.

FIG. 6 is a flowchart illustrating embodiments of a transfer lamination method in accordance with embodiments of the invention. At 180 of the method, the transfer ribbon 100 is fed in the feed direction 134 past the print unit 150 and the transfer unit 160. In some embodiments, step 180 is performed in response to winding the transfer ribbon 100 onto the take-up spool 130 using the motor 132 (FIG. 1). In some embodiments, step 180 is performed in response to rotating the transfer roller 164 using the motor 167. In other embodiments, step 180 is performed in response to the feeding of the substrate 114 along the processing path 120.

At 182, tension in the transfer ribbon 100 is generated using the print head 152 while the transfer ribbon 100 is processed using the transfer unit 160. This tension is generated in a portion of the transfer ribbon 100 that is downstream of the print head 152 relative to the feed direction 134.

In some embodiments, the tension formed in the transfer ribbon 100 is selected to prevent the formation of wrinkles in the transfer ribbon 100 and the transfer film 102, while also preventing the transfer ribbon 100 and the transfer film 102 from being stretched. The techniques described herein allow the tension generated in the transfer ribbon 100 to be substantially continuous, which provides advantages over the prior art techniques. For instance, one prior art technique for providing back tension to the transfer ribbon relies upon the control of a DC motor used to drive the rotation of the transfer ribbon supply roll. Due to the continuously changing diameter of the supply roll and variability in DC motors, the back tension generated in the transfer ribbon using this technique is inconsistent. In accordance with some embodiments of the invention described below, rollers (e.g., transfer roller and/or print roller) having constant diameters are used to provide greater control over the tension generated in the transfer ribbon during step 182.

In some embodiments of step 182, tension is generated in the transfer ribbon 100 by pinching the transfer ribbon 100 between the print head 152 and the print roller 154, as shown in FIGS. 4 and 5. In some embodiments, this pinching of the transfer ribbon 100 resists the feeding of the transfer ribbon 100 in step 180 to generate the desired tension in the transfer ribbon 100.

In some embodiments, the controller 116 controls the speed at which the print roller 154 is rotated by the motor 156 to provide the desired back tension in the transfer ribbon 100. In some embodiments, the print roller 154 is driven at a speed that is slightly slower than the speed at which the transfer ribbon 100 would travel in the feed direction 134 if unrestrained by the print head 152 and the print roller 154. In some embodiments, the motor 156 is a stepper motor that provides accurate control over the rotational speed of the print roller 154.

In some embodiments of step 182, resistance to the feeding of the transfer ribbon 100 in the feed direction 134 is generated by resisting the rotation of the print roller 154. In some embodiments, this resistance to the rotation of the print roller 154 is generated using a suitable clutch mechanism or other resistance producing component.

In some embodiments, the transfer unit 160 processes the transfer ribbon 100 in step 182 by performing a bonding phase, in which the film section is bonded to the surface 162 of the substrate, and a peeling phase, in which the carrier web 104 is peeled away from the film section bonded to the substrate 114. In some embodiments of the bonding phase, a film section of the transfer layer 102 is aligned with the substrate 114 fed from the supply 118. In some embodiments, the film section has a leading edge that is aligned with the leading edge of the substrate 114, in accordance with conventional techniques. In some embodiments, the transfer roller 164 is heated and moved to the operating position using the lift mechanism 168. As the leading edges of the film section and the substrate 114 pass between the transfer roller 164 and the roller 166, the transfer roller 164 applies heat and pressure to the film section, which activates the adhesive in the transfer film 102 and bonds the film section to the surface 162. As the substrate 114 continues along the processing path 120 and the transfer ribbon is fed in the feed direction 134 and wound on the take-up spool 130, the entire transfer section is bonded to the surface 162 of the substrate 114 to complete the bonding phase.

In some embodiments, the tension generating step 182 is performed during the bonding phase. As a result, back tension is formed in the dashed portion of the transfer ribbon 100 extending between the transfer roller 164 and the print head 152, as shown in FIG. 4. In some embodiments, the feeding of the transfer ribbon in the feed direction 134 (step 180) is performed during the bonding phase in response to the rotation of the transfer roller 164 using the motor 167.

In some embodiments of the peeling phase, the carrier web 104 of the transfer ribbon 100 may be partially peeled from the film section during the performance of the bonding phase, as shown in FIG. 4. In some embodiments, this peeling of the carrier web 104 from the film section is facilitated by the peel-off bar 172.

In some embodiments, the transfer roller 164 is disengaged from the transfer film 100 during portions of the peeling phase by moving the transfer roller 164 to the displaced position using the lift mechanism 168, as shown in FIG. 5. Initially following this disengagement of the transfer roller 164 from the transfer ribbon 100, the carrier web 104 remains adhered to the portion of the film section bonded to a trailing end portion 186 of the substrate 114, as shown in FIG. 5.

In some embodiments, step 180 is performed during the peeling phase. In some embodiments, the transfer ribbon 100 is fed in the feed direction 134 in response to winding the transfer ribbon 100 on to the take-up spool 130 using the motor 132. In some embodiments, the transfer ribbon 100 is fed in the feed direction 134 in response to the feeding of the substrate 114 along the processing path 120.

In some embodiments, the tension generating step 182 is performed during the peeling phase, as shown in FIG. 5. As a result, back tension in the transfer ribbon 100 is generated in the dashed portion of the transfer ribbon 100 extending from the trailing edge portion 186 of the substrate 114 to the print head 152, as shown in FIG. 5. The peeling phase is generally completed when the trailing edge of the substrate 114 is fed past the peel-off bar 172, and the carrier web 104 is completely removed from the film section bonded to the substrate 114.

The performance of the tensioning step 182 during the peeling phase can prevent or reduce the occurrence of edge flash along the trailing edge of the substrate 114. As a result, substrates 114 processed in accordance with embodiments of the transfer lamination method are less likely to have edge flash defects.

In some embodiments, a printing phase is performed using the print unit 150 before the transfer unit 160 processes the transfer ribbon 100 in step 182. During the printing phase, an image is printed to the surface 108 of the film section of the transfer layer 102. Thus, the print head 152 may be moved from the displaced position (FIG. 2) to the operating position to pinch the print ribbon 126 and the transfer ribbon 100 against the print roller 154, as shown in FIG. 3. The controller 116 controls the print head 152 to print an image to the surface 108 using conventional techniques. In general, the heating elements of the print head 152 are selectively activated over select panels of the print ribbon 126 to transfer print material from the print ribbon 126 to the film section of the transfer ribbon 100 to form the image on the film section. This printing process may involve the positioning of different panels of the print ribbon 126 over the film section in accordance with conventional techniques.

Following this printing phase, the transfer unit 160 transfers the film section with the printed image to the surface 162 of the substrate 114 as described above. The performance of the tensioning step 182 during the bonding phase can prevent the formation of wrinkles in the transfer ribbon 100 and the imaged film section, which would result in a deformed image on the substrate 114. Additionally, the tensioning step 182 can prevent the imaged film section from being stretched, which would also result in a deformed image on the substrate 114. As a result, embodiments of the transfer lamination method described herein can be used to perform high quality images on substrates.

FIG. 7 is a flowchart illustrating a transfer lamination method in accordance with embodiments of the invention. In some embodiments, the device 112 formed in accordance with one or more embodiments described above, is used to implement the method.

At 190 of the method, the transfer ribbon 100 is fed in the feed direction 134 past the print unit 150 and the transfer unit 160. Embodiments of step 190 include one or more of the techniques described above. For instance, the transfer ribbon 100 may be fed in the feed direction 134 in response to rotation of the take-up spool 130 using the motor 132, as described above.

At 192 of the method, an image is printed to a surface 108 of a film section of a transfer film 102 (FIG. 1) using the print unit 150. Embodiments of this printing phase include those described above.

At 194 of the method, the transfer unit 160 processes the transfer ribbon 100 to perform a bonding phase, in which the film section is bonded to a surface 162 of a substrate 114 using a transfer roller 164 of the transfer unit 160. This bonding phase may be performed in accordance with one or more embodiments described above.

In some embodiments of step 194, tension is generated in a portion of the transfer ribbon 100 (dashed line) extending from the transfer roller 164 to a print head 152 of a print unit 150 using the print head 152, as shown in FIG. 4. As discussed above, this generally involves pinching the transfer ribbon 100 against the print roller 154 using the print head 152 in accordance with one or more embodiments described above.

At 196 of the method, the transfer unit 160 processes the transfer ribbon 100 to perform a peeling phase, during which a carrier web 104 is peeled from the film section. This peeling phase may be performed in accordance with one or more embodiments described above. In some embodiments of step 196, tension is generated in a portion of the transfer ribbon 100 (dashed line) extending from a trailing end portion 186 of the substrate 114 to the print head 152 using the print head, as described above with reference to FIG. 5.

In some embodiments of step 196, the transfer roller 164 is moved from the operating position (FIG. 4) to a displaced position (FIG. 5) using a suitable lift mechanism 168. In some embodiments, the transfer roller 164 is disengaged from the transfer ribbon 100 when moved to the displaced position, as shown in FIG. 5.

In some embodiments, tension is generated in the transfer ribbon 100 during steps 194 or 196 by driving the print roller 154 using a motor 156 in such a manner that the feeding of the transfer ribbon 100 in the feed direction 134 is resisted, as described above. In some embodiments, tension is generated in the transfer ribbon 100 during step 194 or 196 by resisting rotation of the print roller 154 using, for example, a clutch mechanism, as described above.

As discussed above, the substantially continuous back tension applied to the transfer ribbon during the bonding and peeling phases results in improved transfer of the imaged film section to the substrate, and a reduced likelihood of edge flash along the trailing edge of the substrate, as compared to prior art transfer lamination processes.

Although the present invention has been described with reference to preferred embodiments, workers skilled in the art will recognize that changes may be made in form and detail without departing from the spirit and scope of the invention.

What is claimed is:

1. A transfer lamination method using a transfer lamination device, which includes a transfer ribbon comprising a transfer film on a carrier web, a print unit comprising a thermal print head including a plurality of heating elements, and a transfer unit configured to transfer a film section of the transfer film to a substrate, the method comprising:
feeding the transfer ribbon in a feed direction past the print unit and the transfer unit; and
tensioning a portion of the transfer ribbon extending from the transfer unit toward the print head using the print head while processing the transfer ribbon using the transfer unit, comprising resisting feeding of the transfer ribbon in the feed direction including pinching the transfer ribbon between the print head and a print roller of the print unit.

2. The method according to claim 1, wherein resisting feeding of the transfer ribbon in the feed direction comprises driving the print roller using a motor.

3. The method according to claim 1, wherein resisting feeding of the transfer ribbon in the feed direction comprises resisting rotation of the print roller.

4. The method according to claim 1, further comprising printing an image to a surface of the film section using the print head.

5. The method according to claim 1, wherein processing the transfer ribbon using the transfer unit comprises:
bonding the film section to a surface of the substrate; and
peeling the carrier web away from the film section bonded to the substrate.

6. The method according to claim 5, wherein tensioning the transfer ribbon occurs during bonding the film section.

7. The method according to claim 6, wherein:
bonding the film section comprises bonding the film section to the surface of the substrate using a transfer roller of the transfer unit; and
feeding the transfer ribbon comprises rotating the transfer roller using a motor.

8. The method according to claim 5, wherein tensioning the transfer ribbon occurs during peeling the carrier web away from the film section.

9. The method according to claim 8, wherein tensioning the transfer ribbon comprises tensioning a portion of the transfer ribbon extending from a trailing end portion of the substrate to the print head.

10. The method according to claim 9, wherein tensioning the portion of the transfer ribbon comprises disengaging a transfer roller of the transfer unit from the transfer ribbon.

11. A method of performing a transfer lamination using a transfer lamination device, which includes a transfer ribbon comprising a transfer film on a carrier web, a print unit comprising a print head and a print roller, and a transfer unit comprising a transfer roller configured to transfer a film section of the transfer film to a substrate, the method comprising:
feeding the transfer ribbon in a feed direction past the print unit and the transfer unit;
printing an image to a surface of the film section of the transfer film using the print unit;
bonding the film section to a surface of the substrate using the transfer roller while generating tension in a first portion of the transfer ribbon extending from the transfer roller to the print head including pinching the transfer ribbon between the print head and the print roller; and
peeling the carrier web from the film section while generating tension in a second portion of the transfer ribbon extending from a trailing end portion of the substrate to the print head including pinching the transfer ribbon between the print head and the print roller.

12. The method according to claim 11, wherein generating tension in a first portion of the transfer ribbon, and generating tension in a second portion of the transfer ribbon each comprise one of driving the print roller using a motor and resisting rotation of the print roller.

13. The method according to claim 12, further comprising disengaging the transfer roller from the transfer ribbon during generating tension in a second portion of the transfer ribbon.

14. The method according to claim 13, further comprising:
winding the transfer ribbon on a take-up spool using a motor; and
feeding the transfer ribbon in a feed direction comprises one of driving the transfer ribbon in the feed direction in response to winding the transfer ribbon on a take-up spool, and driving rotation of the transfer roller using a motor.

15. The method according to claim 13, wherein bonding the film section to a surface of the substrate using the transfer roller comprises tensioning the first portion of the transfer ribbon.

16. The method according to claim 15, wherein peeling the carrier web from the film section comprises tensing the second portion of the transfer ribbon.

* * * * *